(12) United States Patent
Onimaru et al.

(10) Patent No.: US 10,107,368 B2
(45) Date of Patent: Oct. 23, 2018

(54) CHAIN TENSIONER

(71) Applicant: NTN CORPORATION, Osaka (JP)

(72) Inventors: Kouichi Onimaru, Shizuoka (JP);
Tasuku Furukawa, Shizuoka (JP)

(73) Assignee: NTN Corporation, Osaka (JP)

( * ) Notice: Subject to any disclaimer, the term of this patent is extended or adjusted under 35 U.S.C. 154(b) by 27 days.

(21) Appl. No.: 15/325,539

(22) PCT Filed: Jul. 13, 2015

(86) PCT No.: PCT/JP2015/070003
§ 371 (c)(1),
(2) Date: Jan. 11, 2017

(87) PCT Pub. No.: WO2016/013435
PCT Pub. Date: Jan. 28, 2016

(65) Prior Publication Data
US 2017/0159776 A1 Jun. 8, 2017

(30) Foreign Application Priority Data
Jul. 24, 2014 (JP) ................................. 2014-150457

(51) Int. Cl.
*F16H 7/08* (2006.01)
*F15B 21/04* (2006.01)

(52) U.S. Cl.
CPC ......... *F16H 7/0848* (2013.01); *F15B 21/044* (2013.01); *F16H 2007/0817* (2013.01); *F16H 2007/0859* (2013.01)

(58) Field of Classification Search
CPC ........... F16H 7/0848; F16H 2007/0859; F16H 2007/0817; F15B 21/044
See application file for complete search history.

(56) References Cited

U.S. PATENT DOCUMENTS 5,879,255 A * 3/1999 Yamamoto ............ F16H 7/0848
474/101
8,939,856 B2 * 1/2015 Kurematsu ........... F16H 7/0836
474/101
(Continued)

FOREIGN PATENT DOCUMENTS

CN 103375555 10/2013
EP 2 280 190 2/2011
(Continued)

OTHER PUBLICATIONS

International Preliminary Report on Patentability dated Jan. 24, 2017 in corresponding International (PCT) Application No. PCT/JP2015/070003.
(Continued)

*Primary Examiner* — William E Dondero
*Assistant Examiner* — Mark Kenneth Buse
(74) *Attorney, Agent, or Firm* — Wenderoth, Lind & Ponack, L.L.P.

(57) ABSTRACT

A chain tensioner is provided which is configured such that the air remaining in a pressure chamber can be discharged to the outside through a helical gap defined between a screw and a threaded hole, and through between circumferentially separate radial ends of a spring washer mounted between the screw and a housing. The chain tensioner includes an air discharge groove or grooves formed in the seat surface of the head of the screw such that an annular space defined between the neck of the screw and the inner diameter surface of the spring washer communicates with the outside through the air discharge groove or grooves. Even if foreign objects clog the space between the separate radial ends so as to hinder air from being discharged through between the separate radial ends, the air remaining in the pressure chamber
(Continued)

can be discharged to the outside through the air discharge groove or grooves.

4 Claims, 5 Drawing Sheets

(56) References Cited

U.S. PATENT DOCUMENTS

| | | | |
|---|---|---|---|
| 2008/0280712 A1* | 11/2008 | Ryouno | F16H 7/0836 474/110 |
| 2009/0017949 A1* | 1/2009 | Sato | F16H 7/0836 474/111 |
| 2010/0099529 A1* | 4/2010 | Sato | F16H 7/0836 474/110 |
| 2010/0130320 A1* | 5/2010 | Kitano | F16H 7/0836 474/110 |
| 2013/0288836 A1* | 10/2013 | Kurematsu | F16H 7/0836 474/110 |

FOREIGN PATENT DOCUMENTS

| | | |
|---|---|---|
| JP | 10-26192 | 1/1998 |
| JP | 2010-138942 | 6/2010 |
| JP | 2010-144903 | 7/2010 |
| JP | 2011-27143 | 2/2011 |
| JP | 2012-159112 | 8/2012 |
| JP | 2013-72493 | 4/2013 |

OTHER PUBLICATIONS

International Search Report dated Oct. 6, 2015 in corresponding International (PCT) Application No. PCT/JP2015/070003.
Extended European Search Report dated Jul. 3, 2017 in corresponding European Application No. 15824920.1.

* cited by examiner

US 10,107,368 B2

CHAIN TENSIONER

TECHNICAL FIELD

The present invention relates to a chain tensioner keeping constant the tension of a chain for driving camshafts of automobiles.

BACKGROUND ART

In a chain transmission device configured to transmit the rotation of a crankshaft to camshafts through a timing belt or a timing chain (hereinafter, simply referred to as "chain"), a pivotable chain guide is brought into contact with the loose side of the chain, and an adjustment force is applied to the chain guide by a chain tensioner so as to keep the tension of the chain constant.

As such a chain tensioner, a chain tensioner is known which includes a housing in which a cylinder chamber is formed, a plunger mounted in the cylinder chamber, and a return spring biasing the plunger outwardly, wherein the housing is formed with an oil supply passage communicating with a pressure chamber formed rearwardly of the plunger, wherein the chain tensioner further includes a check valve mounted at the oil outlet side of the oil supply passage so as to prevent hydraulic oil in the pressure chamber from flowing back into the oil supply passage, and wherein the hydraulic oil supplied into the pressure chamber through the oil supply passage buffers the inwardly pressing force applied to the plunger from a chain.

In such a chain tensioner, when the engine is activated, air may be mixed into hydraulic oil being supplied into the pressure chamber through the oil supply passage from an oil pump, and could reach the pressure chamber.

Also, when the plunger moves outwardly rapidly, and the pressure in the pressure chamber decreases rapidly, air might go into the pressure chamber from the outside of the chain tensioner through between the sliding surfaces of the cylinder chamber and the plunger.

If air remains in the pressure chamber, when the chain becomes tense, and thus the plunger is pressed inwardly, the plunger compresses the air, so that the damper effect deteriorates. Therefore, the chain tensioner is unable to function fully.

In order to overcome such a problem, the below-identified Japanese Patent Application Publication No. H10-26192 discloses a chain tensioner further including a screw threadedly engaged in a threaded hole extending to the pressure chamber from the outer periphery of the upper portion of the housing, and a spring washer mounted between the head of the screw and the outer periphery of the housing, and having circumferentially separate radial ends wherein the pressure chamber communicates with the outside of the chain tensioner through a helical gap defined between the threadedly engaged portions of the screw and the threaded hole, and through between the separate radial ends of the spring washer, and wherein when the plunger is pressed inwardly so that the pressure in the pressure chamber increases, the air remaining in the pressure chamber can be discharged to the outside through a communication passage comprising the helical gap and the separate radial ends of the spring washer.

In the chain tensioner disclosed in Japanese Patent Application Publication No. H10-26192, the amount of air discharged from the pressure chamber is controlled by the diameter size of a prepared hole for the threaded hole or by the tightening torque of the screw. However, if the tightening torque is larger than a predetermined value or if foreign matter mixed in engine oil (hydraulic oil) such as dust clog the space between the circumferentially separate radial ends of the spring washer, air is less likely to be discharged from the pressure chamber, so that the air remaining in the pressure chamber tends to hinder the chain tensioner from functioning properly. Therefore, it was necessary to take a measure to reliably discharge air from the pressure chamber.

It is an object of the present invention to provide a chain tensioner in which the air remaining in a pressure chamber can be smoothly and reliably discharged to the outside of the chain tensioner, even if the tightening torque of a screw is not controlled fully, or even if foreign matter clog the space between separate ends of a spring washer for preventing the screw from loosening.

SUMMARY OF THE INVENTION

In order to achieve the above object, the present invention provides a chain tensioner comprising: a housing in which a cylinder chamber is formed; a plunger slidably mounted in the cylinder chamber; and a return spring biasing the plunger outwardly; wherein the housing is formed with an oil supply passage communicating with a pressure chamber formed rearwardly of the plunger, and a threaded hole extending to the pressure chamber from an outer periphery of an upper portion of the housing, wherein the chain tensioner further comprises: a check valve mounted at an oil outlet side of the oil supply passage so as to prevent hydraulic oil in the pressure chamber from flowing back into the oil supply passage; a screw threadedly engaged in the threaded hole; and a spring washer mounted between a head of the screw and the outer periphery of the housing, and having circumferentially separate radial ends, and wherein the chain tensioner is configured such that air remaining in the pressure chamber can be discharged to outside of the chain tensioner through a helical gap defined between threadedly engaged portions of the screw and the threaded hole, and through between the separate radial ends of the spring washer, characterized in that at least one air discharge groove is formed in one of a seat surface of the head of the screw and an abutment surface of the spring washer with which the seat surface is in abutment such that an annular space defined between an outer diameter surface of a neck of the screw and an inner diameter surface of the spring washer communicates with the outside through the air discharge groove.

By forming, as described above, an air discharge groove in either the seat surface of the head of the screw or the abutment surface of the spring washer such that the annular space defined between the outer diameter surface of the neck of the screw and the inner diameter surface of the spring washer communicates with the outside through the air discharge groove, even if the screw is tightened beyond a predetermined value, or even if foreign objects clog the space between the separate ends of the spring washer so as to hinder air from being discharged through between the separate ends, the pressure chamber is in communication with the outside through the helical gap, the annular space, and the air discharge groove. Therefore, even if foreign objects clog the space between the separate ends of the spring washer so as to hinder air from being discharged through between the separate ends, the air remaining in the pressure chamber can be smoothly and reliably discharged to the outside through the air discharge groove.

The at least air discharge groove may comprise a plurality of radially extending air discharge grooves or a spiral air discharge groove. In the arrangement in which an radially extending air discharge groove or grooves are formed in the seat surface of the head of the screw, if a circular recess is formed in the inner peripheral portion of the seat surface, it is possible to easily form the radially extending air discharge groove or grooves, and to make the air discharge groove or grooves reliably communicate with the annular space.

ADVANTAGEOUS EFFECTS OF THE INVENTION

Since, as described above, the chain tensioner according to the present invention includes an air discharge groove formed in either the seat surface of the head of the screw or the abutment surface of the spring washer such that the annular space defined inside of the spring washer communicates with the outside through the air discharge groove, even if foreign objects clog the space between the separate ends of the spring washer so as to hinder air from being discharged through between the separate ends, the air remaining in the pressure chamber can be smoothly and reliably discharged to the outside through the helical gap, the annular space, and the air discharge groove.

DETAILED DESCRIPTION OF THE INVENTION

Figure 1:
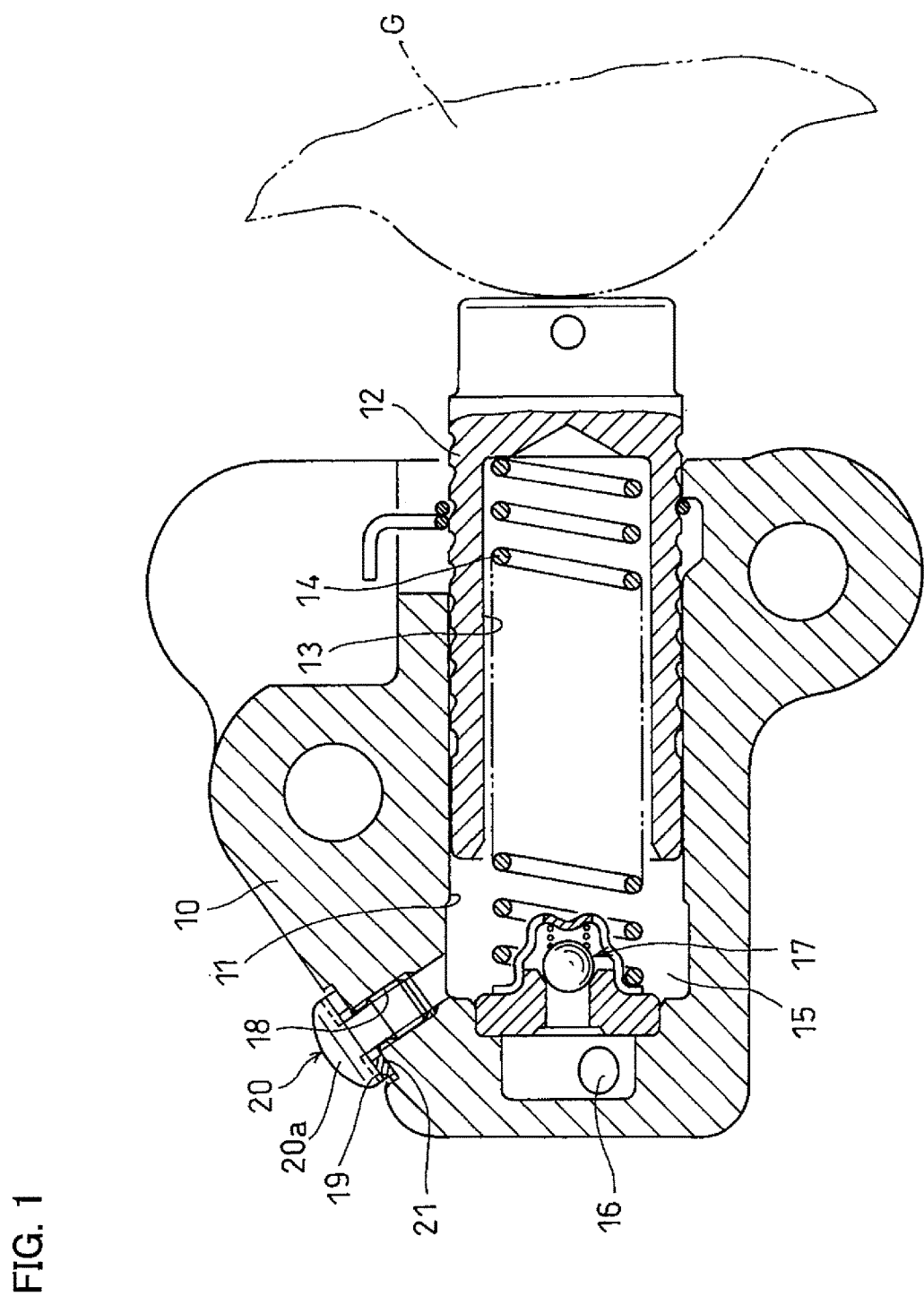
FIG. 1 is a vertical sectional view of a chain tensioner according to an embodiment of the present invention.

A chain tensioner according to the embodiment of the present invention is now described with reference to the drawings. As illustrated in FIG. 1, the chain tensioner includes a housing 10 formed with a cylinder chamber 11 which opens to the outer peripheral surface of the housing 10 on one side thereof, and a plunger 12 slidably mounted in the cylinder chamber 11.

The plunger 12 is formed with an axial hole 13 which opens to the rear end surface of the plunge 12. The chain tensioner further includes a return spring 14 mounted between the closed end of the axial hole 13 and the closed end of the cylinder chamber 11 so as to bias the plunger 12 outwardly.

The housing 10 is formed with an oil supply passage 16 communicating with a pressure chamber 15 formed rearwardly of the plunger 12. The chain tensioner further includes a check valve 17 mounted at the oil outlet side of the oil supply passage 16 so as to prevent hydraulic oil in the pressure chamber 15 from flowing back into the oil supply passage 16.

The housing 10 is further formed with a threaded hole 18 extending to the pressure chamber 15 from the outer periphery of the upper portion of the housing 10, and a circular counterbore 19 at the upper end of the threaded hole 18.

Figure 2:
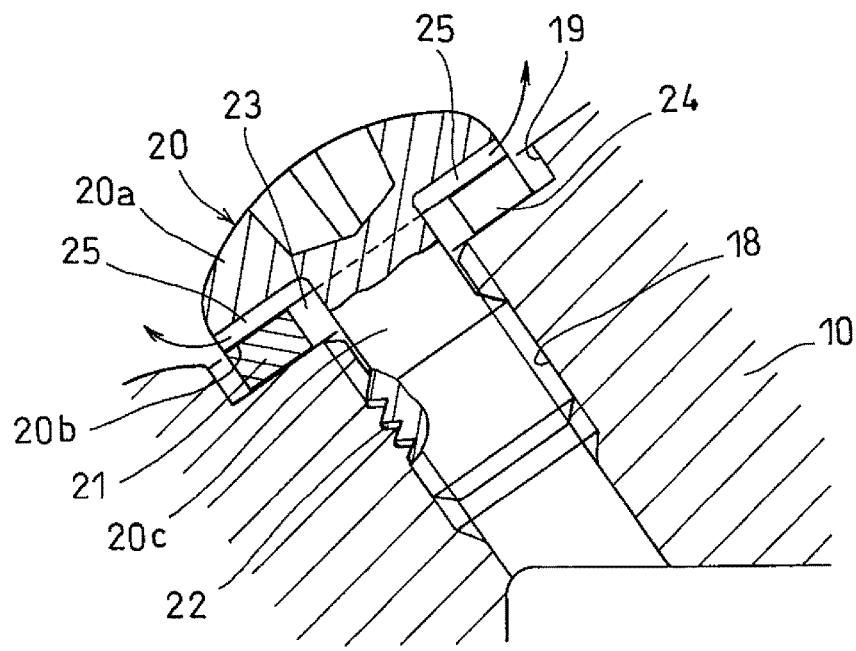
FIG. 2 is an enlarged sectional view of main components of the chain tensioner of FIG. 1.

As illustrated in FIG. 2, the chain tensioner further includes a screw 20 screwed into the thread hole 18, and a spring washer 21 mounted between the head 20a of the screw 20 and the bottom surface of the counterbore 19, and having circumferentially separate radial ends 24. A helical gap 22 is defined between the threadedly engaged portions of the screw 20 and the threaded hole 18. An annular space 23 is defined between the outer diameter surface of the neck 20c of the screw 20 and the inner diameter surface of the spring washer 21. The pressure chamber 15 communicates with the outside of the chain tensioner through the helical gap 22 and the annular space 23, and through between the circumferentially separate radial ends 24 of the spring washer 21.

Figure 3:
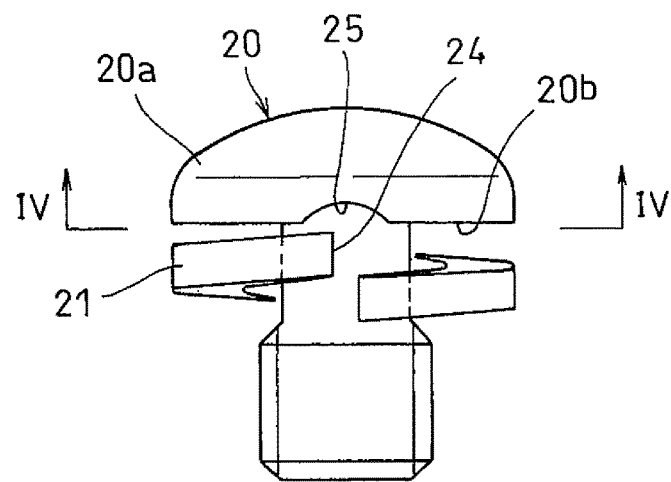
FIG. 3 is a front view of the screw and the spring washer illustrated in FIG. 2.
Figure 4:
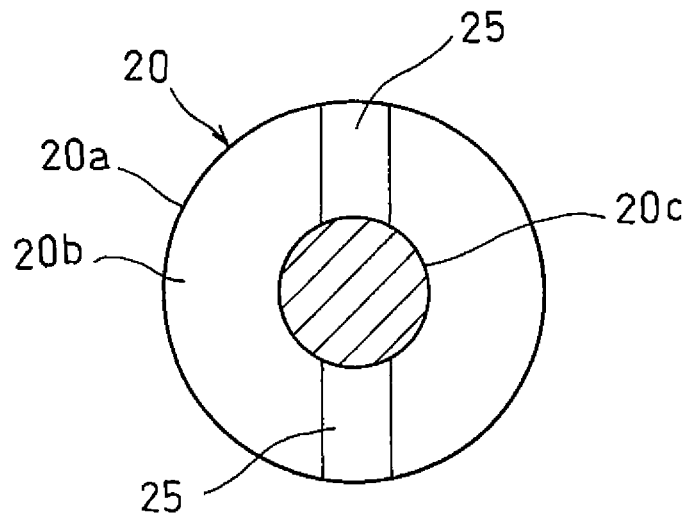
FIG. 4 is a sectional view taken along line IV-IV of FIG. 3.
Figure 5:
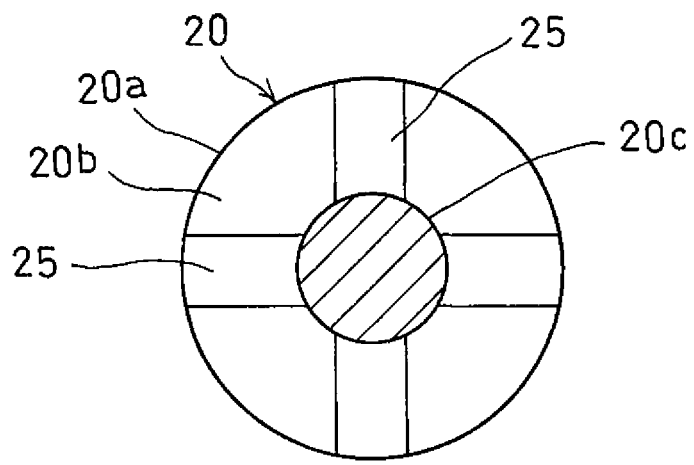
FIG. 5 is a sectional view illustrating a different air discharge groove.

As illustrated in FIGS. 2 to 4, air discharge grooves 25 are formed in the seat surface 20b of the head 20a of the screw 20 such that the annular space 23, defined inside of the spring washer 21, communicates with the outside through the air discharge grooves 25. As illustrated in FIG. 4, the air discharge grooves 25 comprise two grooves extending in opposite radial directions to each other. Alternatively, as illustrated in FIG. 5, more than two radial air discharge grooves 25 may be formed in the seat surface 20b. Further alternatively, instead of radial air discharge grooves, a spiral or inclined air discharge groove may be formed in the seat surface 20b This chain tensioner presses a chain (not shown) through a chain guide G pivotally supported by the plunger 12, which is biased outwardly by the return spring 14 such that when the chain becomes loose, the chain tensioner absorbs the looseness of the chain by moving the plunger 12 outwardly.

When the plunger 12 moves outward, the volume of the pressure chamber 15 increases, so that the pressure in the pressure chamber 15 decreases. Therefore, the check valve 17 opens, and hydraulic oil is supplied into the pressure chamber 15 through the oil supply passage 16 and the now-open check valve 17.

When the chain becomes tense, and thus the plunger 12 is pressed inwardly, the check valve 17 closes, and the hydraulic oil sealed in the pressure chamber 15 buffers the inwardly pressing force applied to the plunger 12. If this inwardly pressing force is stronger than the elastic force of the return spring 14, hydraulic oil in the pressure chamber 15 leaks to the outside through between the sliding surfaces of the cylinder chamber 11 and the plunger 12, so that the plunger 12 retracts to the position in which the above inwardly pressing force is equal to the elastic force of the return spring 14, and stops.

When the engine is activated, air may be mixed into hydraulic oil being supplied into the pressure chamber 15 through the oil supply passage 16 from an oil pump, and could reach the pressure chamber 15.

Also, when the plunger 12 moves outwardly rapidly, and the pressure in the pressure chamber 15 decreases rapidly, air might go into the pressure chamber 15 from the outside through between the sliding surfaces of the cylinder chamber 11 and the plunger 12.

If air remains in the pressure chamber 15, when the chain becomes tense, and thus the plunger 12 is pressed inwardly, the plunger 12 compresses the air, so that the damper effect deteriorates. Therefore, the chain tensioner is unable to function fully. However, since the pressure chamber 15 is in communication with the outside through the helical gap 22 and the annular space 23, and through between the separate ends 24 of the spring washer 21, when the plunger 12 retracts, and the pressure in the pressure chamber 15 increases, the air remaining in the pressure chamber 15 is discharged to the outside through the helical gap 22 and the annular space 23, and through between the separate ends 24.

Since, as illustrated in FIGS. 2 to 5, the chain tensioner of the embodiment includes an air discharge groove or grooves 25 formed in the seat surface 20b of the head 20a of the screw 20 such that the annular space 23 defined between the outer diameter surface of the neck 20c of the screw 20 and the inner diameter surface of the spring washer 21 communicates with the outside through the air discharge groove or grooves 25, even if foreign objects clog the space between the separate ends 24 of the spring washer 21 so as to hinder air from being discharged through between the separate ends 24, the air remaining in the pressure chamber 15 can be smoothly and reliably discharged to the outside through the helical gap 22, the annular space 23, and the air discharge groove or grooves 25.

Figure 6A:
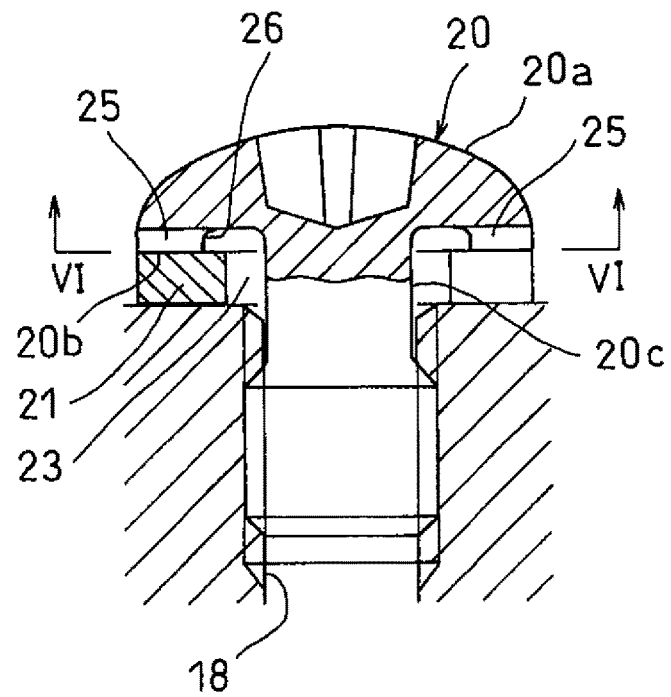
FIG. 6A is a vertical sectional view illustrating a still different air discharge groove.
Figure 6B:
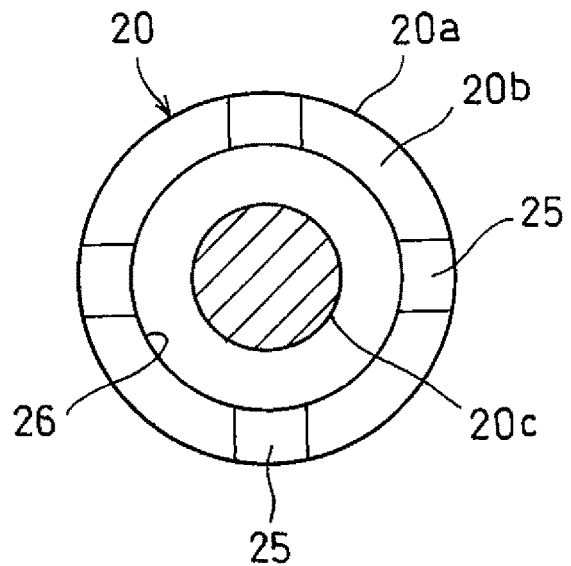
FIG. 6B is a sectional view taken along line IV-IV of FIG. 6A.

FIGS. 6A and 6B illustrate different air discharge grooves 25. The air discharge grooves 25 shown in FIGS. 6A and 6B are different from the air discharge grooves 25 of FIG. 5 in that they communicate with a circular recess 26 formed in the seat surface 20b of the head 20a of the screw 20 at its inner peripheral portion. Therefore, the elements other than the circular recess 26 are denoted by the same reference numerals as used above, and their description is omitted.

By forming a circular recess 26 in the inner peripheral portion of the seat surface 20b of the screw 20 as illustrated in FIGS. 6A and 6B, it is possible to easily form the radial grooves 25, and to make the radial grooves 25 reliably communicate with the annular space 23.

While the air discharge grooves 25 are formed in the seat surface 20b of the head 20a of the screw 20 in FIGS. 4 to 6B, such air discharge groove or grooves 25 may be formed in the abutment surface of the spring washer 21 with which the seat surface 20b is brought into abutment.

Figure 7:
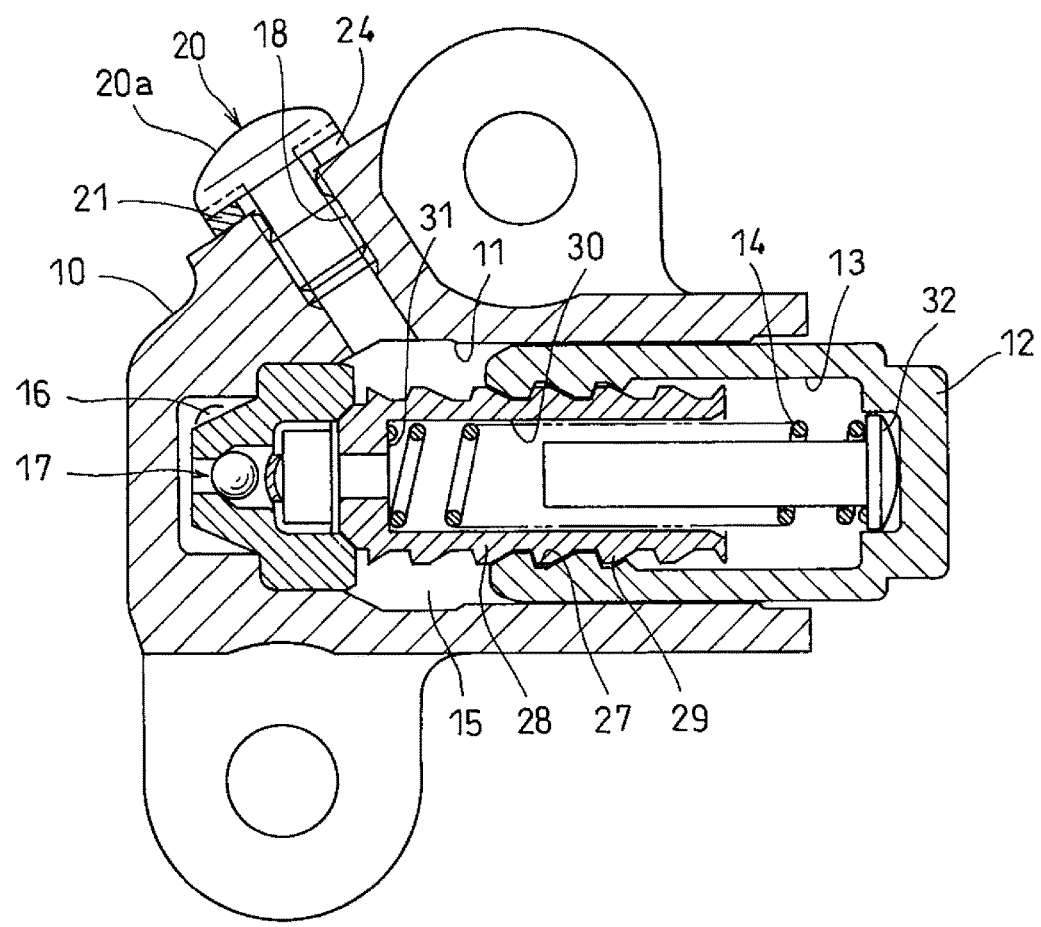
FIG. 7 is a sectional view of a different chain tensioner.

FIG. 7 illustrates a different chain tensioner according to the present invention. This chain tensioner includes a plunger 12 formed with an axial hole 13 having a serration-shaped internal thread 27 in the inner periphery of the hole 13 at its open end, a screw rod 28 having a serration-shaped external thread 29 formed on the outer periphery of the rod 28 so as to be threadedly engaged with the internal thread 27, and a return spring 14 and a spring sheet 32 which are mounted between the closed end of the axial hole 13 of the plunger 12 and an inner peripheral step 31 of an axial stepped hole 30 formed in the screw rod 28. The other structures of the chain tensioner illustrated in FIG. 7 are identical to those of the chain tensioner illustrated in FIG. 1. Therefore, the other elements of the chain tensioner of FIG. 7 are denoted by the same reference numerals as used in the chain tensioner of FIG. 1, and their description is omitted.

The chain tensioner of FIG. 7 is configured such that when the engine is stopped, even if the chain becomes tense due to the cam or cams stopping at certain positions, and as a result, an inwardly pressing force is applied to the plunger 12 from the chain, this inwardly pressing force is received by the pressure flanks of the serration-shaped internal and external threads 27 and 29, and the plunger 12 does not retract.

Therefore, even when the engine is activated again, the looseness of the chain is small, and thus the plunger 12 does not protrude outwardly to a large extent. Therefore, the pressure in the pressure chamber 15 decreases to a small extent, so that air does not go into the pressure chamber 15 from the outside.

DESCRIPTION OF REFERENCE NUMERALS

10: housing
11: cylinder chamber
12: plunger
14: return spring
15: pressure chamber
16: oil supply passage
17: check valve
18: threaded hole
20: screw
20a: head
20b: seat surface
20c: neck
21: spring washer
22: helical gap
23: annular space
24: separate ends
25: air discharge groove
26: circular recess

The invention claimed is:

1. A chain tensioner comprising:
a housing having a cylinder chamber formed therein;
a plunger slidably mounted in the cylinder chamber, the housing being formed with an oil supply passage communicating with a pressure chamber formed rearwardly of the plunger, and a threaded hole extending to the pressure chamber from an outer periphery of an upper portion of the housing;
a return spring biasing the plunger outwardly;
a check valve mounted at an oil outlet side of the oil supply passage so as to prevent hydraulic oil in the pressure chamber from flowing back into the oil supply passage;
a screw threadedly engaged in the threaded hole; and
a spring washer mounted between a head of the screw and the outer periphery of the housing, the spring washer having circumferentially separate radial ends,
wherein the chain tensioner is configured such that air remaining in the pressure chamber can be discharged to outside of the chain tensioner through a helical gap defined between threadedly engaged portions of the screw and the threaded hole, and through between the separate radial ends of the spring washer, and
wherein at least one air discharge groove is formed in one of a seat surface of the head of the screw and an abutment surface of the spring washer with which the seat surface is in abutment such that an annular space defined between an outer diameter surface of a neck of the screw and an inner diameter surface of the spring washer communicates with the outside through the at least one air discharge groove.

2. The chain tensioner according to claim 1, wherein the at least one air discharge groove comprises a plurality of radially extending air discharge grooves.

3. The chain tensioner according to claim 2, wherein the at least one air discharge groove is formed in the seat surface of the head of the screw, and a circular recess is formed in an inner peripheral portion of the seat surface so as to communicate with the annular space.

4. The chain tensioner according to claim 1, wherein the at least one air discharge groove is formed in the seat surface of the head of the screw, and a circular recess is formed in an inner peripheral portion of the seat surface so as to communicate with the annular space.

* * * * *